(12) United States Patent
Ahuja et al.

(10) Patent No.: US 10,313,362 B2
(45) Date of Patent: Jun. 4, 2019

(54) SYSTEMS AND METHODS FOR REAL-TIME CONFIGURABLE LOAD DETERMINATION

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US)

(73) Assignee: ShieldX Networks, Inc., San Jose, CA (US)

( * ) Notice: Subject to any disclaimer, the term of this patent is extended or adjusted under 35 U.S.C. 154(b) by 167 days.

(21) Appl. No.: 15/224,374

(22) Filed: Jul. 29, 2016

(65) Prior Publication Data

US 2018/0034832 A1    Feb. 1, 2018

(51) Int. Cl.
| | | |
|---|---|---|
| *G08B 23/00* | (2006.01) | |
| *G06F 12/16* | (2006.01) | |
| *G06F 12/14* | (2006.01) | |
| *G06F 11/00* | (2006.01) | |
| *H04L 29/06* | (2006.01) | |
| *H04L 29/08* | (2006.01) | |
| *G06F 21/62* | (2013.01) | |

(52) U.S. Cl.
CPC ........ *H04L 63/1408* (2013.01); *G06F 21/629* (2013.01); *H04L 63/20* (2013.01); *H04L 67/1029* (2013.01); *H04L 67/16* (2013.01)

(58) Field of Classification Search
CPC ...... H04L 63/1408; H04L 67/10; H04L 67/16
USPC ........................................................ 726/22
See application file for complete search history.

(56) References Cited

U.S. PATENT DOCUMENTS

| | | | | |
|---|---|---|---|---|
| 9,467,476 | B1* | 10/2016 | Shieh | H04L 63/20 |
| 9,716,617 | B1 | 7/2017 | Ahuja et al. | |
| 2010/0299437 | A1* | 11/2010 | Moore | H04L 67/1008 709/226 |
| 2016/0094384 | A1* | 3/2016 | Jain | H04L 41/0803 709/221 |
| 2016/0112475 | A1* | 4/2016 | Lawson | H04L 65/403 709/204 |
| 2016/0269482 | A1* | 9/2016 | Jamjoom | H04L 67/1095 |
| 2017/0230349 | A1* | 8/2017 | Gaur | G06F 21/00 |
| 2017/0289307 | A1* | 10/2017 | Thompson | H04L 41/0823 |
| 2017/0359217 | A1 | 12/2017 | Ahuja et al. | |
| 2018/0027080 | A1* | 1/2018 | Yang | H04L 67/16 |

OTHER PUBLICATIONS

A R Manu; Docker container security via heuristics-based multilateral security—conceptual and pragmatic study; IEEE:2016; p. 1-14.*

(Continued)

*Primary Examiner* — Monjur Rahim
(74) *Attorney, Agent, or Firm* — Nicholson De Vos Webster & Elliott, LLP

(57) ABSTRACT

Systems and methods are described herein generally relating to network security, and in particular, embodiments described generally relate to real-time configurable load determination. For example, a method is disclosed, which calls for receiving a request to perform a security service, performing the security service on data included with the request; calculating a service load associated with and during the performing the security service, and transmitting a response to the request, wherein the response includes the calculated service load.

20 Claims, 10 Drawing Sheets

(56) References Cited

OTHER PUBLICATIONS

Advisory Action from U.S. Appl. No. 15/182,573, dated Mar. 21, 2017, 3 pages.
Final Office Action from U.S. Appl. No. 15/182,573 dated Jan. 9, 2017, 8 pages.
Final Office Action from U.S. Appl. No. 15/194,561, dated Feb. 12, 2018, 5 pages.
International Search Report and Written Opinion for Application No. PCT/US2016/058512, dated Mar. 8, 2017, 11 pages.
Lewis J., et al., "Microservices," Mar. 16, 2014, XP055347623, downloaded from the internet https://web.archive.org/web/20140316080617/http://martinfowler.com/articles/microservices.html on Feb. 20, 2017, 8 pages.
Non-Final Office Action from U.S. Appl. No. 15/182,573 dated Aug. 25, 2016, 9 pages.
Non-Final Office Action from U.S. Appl. No. 15/194,561, dated Sep. 8, 2017, 14 pages.
Notice of Allowance from U.S. Appl. No. 15/182,573, dated Jun. 8, 2017, 15 pages.
Toffetti G., et al., "An Architecture for Self-managing Microservices," International Workshop on Automated Incident Management in Cloud (AIMC'15), In conjunction with EuroSys'15, The European Conference on Computer Systems, Apr. 21, 2015, pp. 19-23.

\* cited by examiner

US 10,313,362 B2

SYSTEMS AND METHODS FOR REAL-TIME CONFIGURABLE LOAD DETERMINATION

TECHNICAL FIELD

Embodiments described herein generally relate to network security. In particular, embodiments described generally relate to real-time configurable load determination.

BACKGROUND INFORMATION

The expansion of cloud computing services has led to datacenters housing collections of servers to provide computing capacity to run various applications. Data traveling between servers and client applications needs to be monitored for security.

BRIEF DESCRIPTION OF THE DRAWINGS

The various advantages of the embodiments disclosed herein will become apparent to one skilled in the art by reading the following specification and appended claims, and by referencing the drawings, in which:

DETAILED DESCRIPTION

Figure 1:
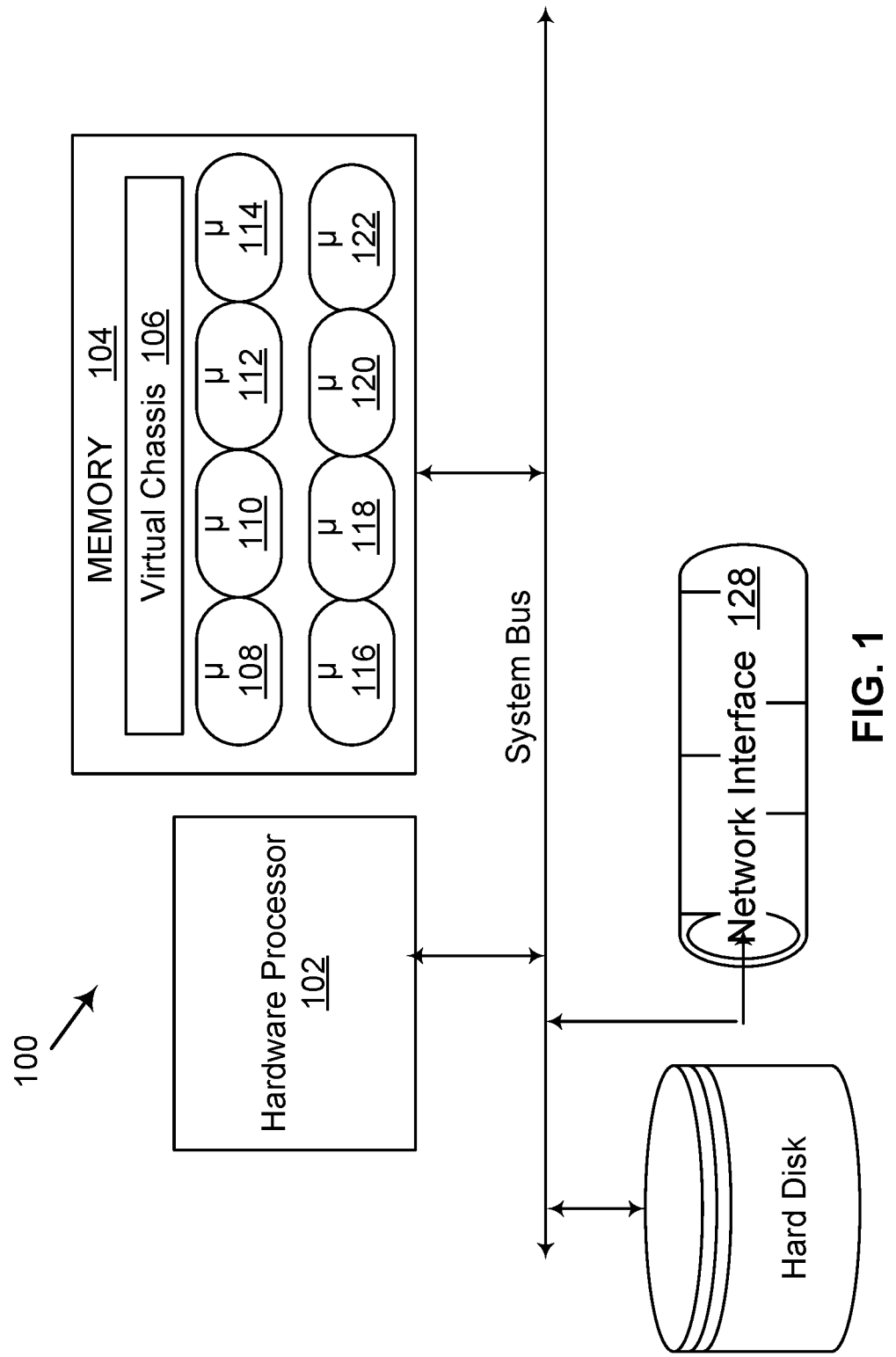
FIG. 1 is a block diagram illustrating a datacenter for hosting a network security system consisting of security microservices according to an embodiment.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A security system that monitors network traffic often includes multiple interface microservices and multiple security microservices to receive and process network traffic. Frequently, network traffic passes through multiple, distinct security microservices as it transitions through the security system. As the traffic flows through the security microservices, load balancing decisions are made (e.g., by each security microservice or a central entity) to select a next security microservice and to distribute workloads across multiple security microservices. One challenge in managing data flow in such a datacenter is to conduct a load balancing to properly select which interfaces and which security microservices to route data to. Round-robin or random load balancing decisions can be used, but often yield suboptimal routing. Unfortunately, load balancing within a security services deployment may exhibit a number of limitations. These limitations can be grouped into the general categories of insufficient loading knowledge, poor temporal response and poor accuracy.

Performing a load balancing decision at a point in an architecture wherein the effect on subsequent steps or components cannot be gauged may be described as load balancing without sufficient loading knowledge. An example of such a situation can be seen when Internet protocol (IP) address hashing is used to load balance traffic streams to a plurality of appliances. If the loading impact to each appliance or service (such as an encryption appliance, content scanning appliance or other appliance) cannot be estimated by IP address, the load will not be balanced across the appliances, but randomly partitioned. The load balancing decision, made without knowledge of the impending processing requirement, cannot effectively balance traffic among the appliances.

Furthermore, temporal response is important to any load balancing system in that the most accurate loading information will generally allow for the most accurate load balancing decision. However, updating loading statistics in real-time may pose additional performance limitations on a system. In many cases, it is desirable to evaluate both loading and latency of a plurality of entities to be balanced such that the load balancing calculation incorporates the requirements of the current operation (to be transmitted to, or balanced among said entities). Obtaining these metrics from global statistics in real-time may not be possible or impose additional performance issues.

Accuracy of the load metrics are beneficial to embodiments of a datacenter. For a virtual environment, there exist loading parameters for the physical server, the virtual servers and the applications themselves. These metrics may provide conflicting accounts of the current load. As an example, virtual environments may report being starved of memory resources to the hypervisor attempting to force memory reclamation. The loading reported by the physical and virtual central processing units (CPUs) need not, and often is not, consistent. This leaves the application with limited ability to accurately assess its own loading and a general inability to report this loading in a consistent and usable form to the other applications.

Detailed herein are embodiments which generate a temporally relevant and scaled loading metric to inform load balancing decisions within a hierarchy of security microservices. Each microservice attempts to determine the most suitable higher-level microservice through the reception of a load metric generated by each upper-level microservice in each response message. In some embodiments, the load metrics are then t stored in a loading table, which is parsed to identify the least-loaded higher-level microservice. In some embodiments, other metrics are included in this table (such as latency, round-robin counters, or other metrics).

FIG. 1 is a block diagram illustrating an embodiment of components of a scalable microservice architecture using microservices. Network security system microservices are stored in memory (e.g., volatile memory such as Random Access Memory (RAM) and/or non-volatile memory such as disk) and executed by one or more hardware processors or processor cores. Network security system microservices, consisting of computer-executable instructions to perform a specific security service, are deployed based on configuration across available physical servers. Typically, each microservice receives configuration and tasks via a backplane of a virtual chassis 106 and returns status, statistics and other information to the backplane. A common property of a microservice is the separation and protection of memory from other microservices. In this manner, an individual microservice may be moved to another physical server or terminate abnormally without impacting other microservices.

The data processed by the security system is transferred from a microservice to another (higher hierarchy) microservice using a data plane. In some embodiments, during such a transfer, the lower microservice makes a decision (based on configuration, current statistics and other information) as to which higher-hierarchy microservice to utilize. Such a decision may constitute a load-balancing decision to assure that the higher-hierarchy microservices are efficiently utilized. In other embodiments, the decision of which microservice to utilize is made by a more central entity.

As illustrated, network security system utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices store in memory 104 (e.g., volatile memory such as Random Access Memory (RAM) and/or non-volatile memory such as disk). A network interface 128 (e.g., fabric or interconnect that is wired or wireless) provides a means for communicating with a data center. Network security system may inspect traffic, detect threats, and otherwise protects a data center, as further described below, using microservices.

Embodiments of a network security system providing the above capabilities are now discussed in more detail. Network security system adds security to, or enhances the security of, a datacenter. In an embodiment, network security system is delivered in the form of a seed software application (e.g., downloaded). The seed software application instantiates microservices of the network security system on a host in the datacenter. As used herein a microservice container refers to where the microservice runs, most prominently a virtual machine. Once deployed, network security system utilizes available processing power (as detailed above) provided by hardware processor 102, memory 104, and network interface 128. In many scenarios, security may be added/configured using existing hardware and/or without having to purchase specific rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

Once initiated, as also further described below, network security system, in some embodiments, will utilize network interface 128 to explore the datacenter to discover what network segments exist, the security requirements of various network segments, and what hosts and hardware resources are available, and additional configuration information as needed. In an embodiment, the datacenter itself includes several machines with hypervisors, or physical hardware, and the network security system 100 offers microservices to communicate with and protect one or more of those internal virtual machines or physical hardware. After performing datacenter discovery, network security system will, in some embodiments, then offer or suggest available security tools to be selected either through a user interface, or by connections with existing enterprise management software. In one embodiment, once configured, network security system is deployed "in-line," receiving substantially all of the packets headed for the datacenter, allowing network security system to intercept and block suspicious traffic before it the datacenter. With an understanding of the datacenter, network security system 100 deploys microservices to inspect traffic throughout the datacenter, not just at the ingress. In some embodiments, network security system is deployed in a "copy only" configuration, in which it monitors traffic, detects threats, and generates alerts, but does not intercept traffic before it arrives at the datacenter.

Referring again to FIG. 1, though not shown, hardware processor 102 in one embodiment includes one or more levels of cache memory. As shown, memory 104 has stored therein microservices 108, 110, 112, 114, 116, 118, 120, and 122 (108-122), as well as virtual chassis 106, which is itself a microservice. In an embodiment, the microservices are small in size, consisting of a relatively small number of instructions. In an embodiment, the microservices are independent of each other. As illustrated, microservices 108-122 are microservices that are loaded from memory and executed by the hardware processor 102. Those microservices include datapath security microservices, for example TCP/IP, SSL, DPI, or DPL inspection microservices, as described further below with respect to FIGS. 2 and 3. The microservices may also include management microservices, for example a chassis controller to manage the microservices, a configuration microservice, an infrastructure discovery microservice, a database microservice to store data, and a policy update microservice to receive policy updates from an external security cloud, and a compiler to receive policy data from various sources and to produce binary policy outputs to be used by the microservices, to name a few examples that are described further below with respect to FIGS. 2 and 3.

Network security system receives traffic via network interface 128 to/from s datacenter. In one embodiment, network security system is placed in-line to inspect traffic, and potentially intercept a threat before it arrives at, or leaves, the datacenter. In alternate embodiments, network security system monitors the traffic heading into, or out of, the datacenter, in which case the network security system detects threats and generates alerts, but does not block the data. Hardware processor 102 then executes various data security microservices on the data. For example, as will be described further below with respect to FIGS. 2 and 3, typically traffic first passes into and through a segment microservice, then a TCP/IP inspection microservice, then an SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Datapath microservices as used herein refer to various microservices that inspect and analyze network traffic, such as TCP, TLS, DPI, NOX, or DLP. TCP microservice, for example, refers to a packet handling microservice able to process any layer 4-to-6 network packet and includes part of Firewalling. TLS microservice, for example, refers to Transport Layer Security microservice, which decrypts/re-encrypts connections. DPI microservice, for example, refers to Deep Packet Inspection microservice and handles layer 7 inspection. NOX microservice, for example, refers to Network Object Extractor microservice, and works in conjunction with DPI to assemble objects from individual packets and deliver them to other services. DLP microservice, for example, refers to Data Loss Prevention microservice, which detects and prevents data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices will, in one embodiment, be reported to a chassis controller microservice, which takes remedial action.

In an embodiment, microservices 108-122 are implemented using computer-executable instructions loaded from the Internet, via network interface 128. For instance, in an embodiment, the microservices are implemented using computer-executable instructions downloaded from a web site or online store site. In some embodiments, microservices 108-122 are loaded into memory 104. In various embodiments, the microservices are implemented with computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium in one instance are stored into memory 104. The embodiments are not limited in this context. In further embodiments, a digital medium is a data source that constitutes a combination of hardware elements such as a processor and memory.

In most embodiments, network security system runs on a datacenter computer. In alternate embodiments, however, network security system is installed and runs on any one of a wide variety of alternate computing platforms, ranging from low-cost to high-cost, and from low-power to high power. In some embodiments, network security system is installed on and runs on a low-cost, commodity server computer, or, in some embodiments, on a low-cost rack-mounted server. As illustrated, hardware processor 102 is a single core processor. In alternate embodiments, hardware processor 102 is a multi-core processor. In alternate embodiments, hardware processor 102 is a massively parallel processor.

In some embodiments, virtual chassis 106 and microservices 108-122 may be hosted on any of a wide variety of hardware platforms used in the datacenter to be protected. Table 1, below, lists and describes a number of exemplary datacenter environments, any one of which hosts virtual chassis 106 and microservices 108-122:

TABLE 1

Environments for hosting virtual chassis 106

| Environment | Description |
|---|---|
| Bare Metal | This environment is associated with the North/South Use Case. Network security system microservices will be hosted on ESX hypervisors and physical hosts upon which the FE microservices reside will be connected to the physical network where required. There will be no orchestration/integration touch point for this environment. |
| ESX | This environment is associated with the East/West Use Case. Network security system microservices will be hosted on ESX hypervisors. The orchestration/integration touch point will be vCenter. |
| NSX | This environment is associated with the East/West Use Case. Network security system microservices will be hosted on ESX hypervisors. The orchestration/integration touch point will be NSX Controller. |
| OpenStack | This environment is associated with the East/West Use Case. Network security system microservices will be hosted on KVM hypervisors. The orchestration/integration touch point remains to be determined. Because of the fragmented nature of the OpenStack market, the Network security system) will be developed and tested to a single choice of version, distribution and network controller and will then be customized on a customer-by-customer basis. |
| AWS | This environment is associated with the Public Cloud Use Case. Network security system microservices will be hosted as AWS instances. The orchestration/integration touch point will be AWS Config/AWS OpsWorks. |
| Microsoft Azure | This environment is associated with the Public Cloud Use Case. Network security system) microservices will be hosted as Azure Virtual Machines. The orchestration/integration touch point will be Azure Automation and Runbooks. |

In some examples, network security system scales out using available resources to accommodate higher traffic or load. In an exemplary embodiment hardware processor 102 and memory 104 is scaled out or in dynamically as needed: additional CPUs and memory are added if scaling out, and some CPUs and/or memory are powered down if scaling in. This scaling out is performed to allocate the additional CPUs and memory to those portions of the security hierarchy for which they are needed while not allocating additional CPUs and memory to those portions of the security hierarchy that can accommodate the higher traffic utilizing their existing allocation.

A common property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of the operating system on which they were spawned.

Figure 2:
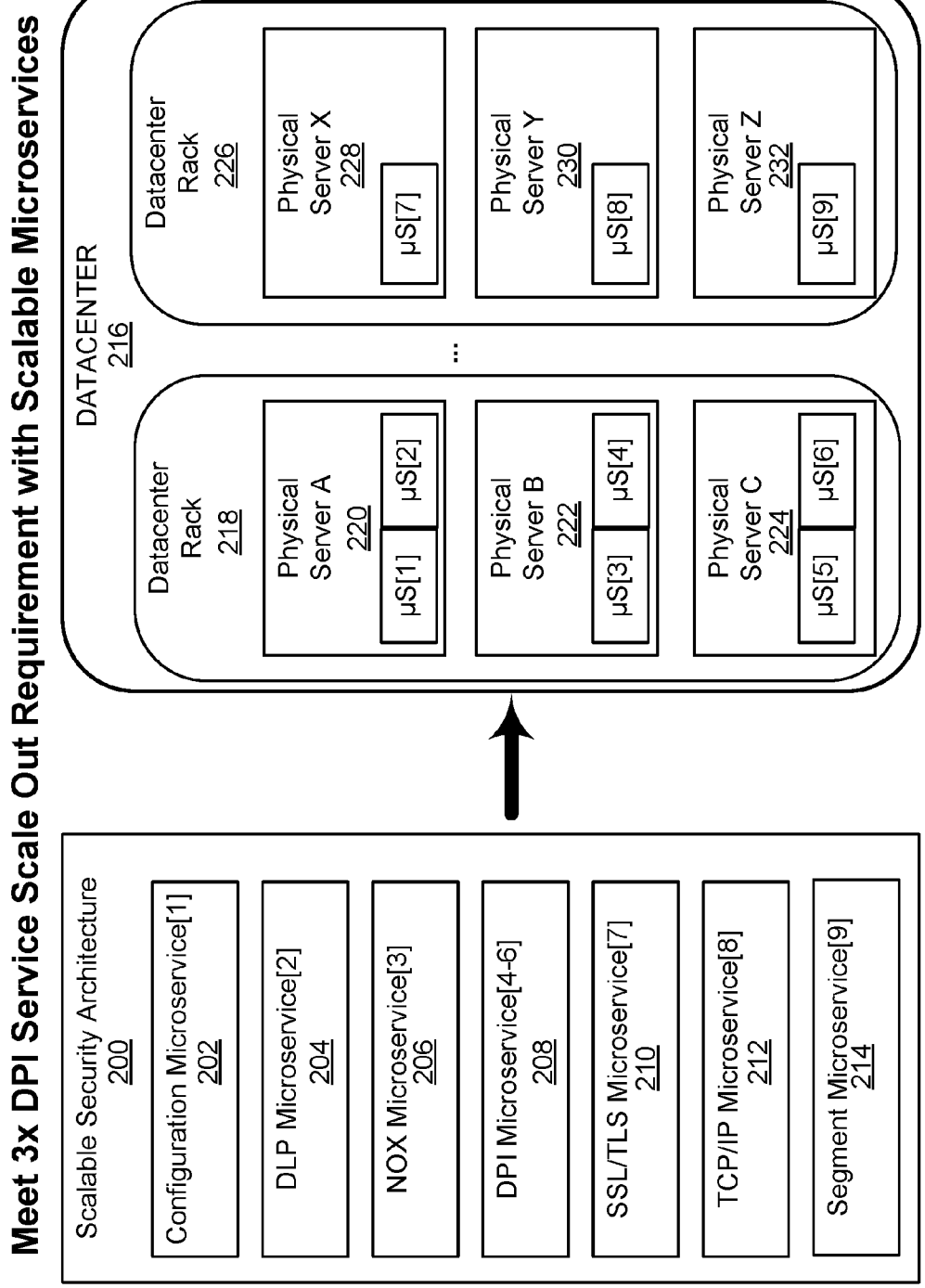
FIG. 2 illustrates an embodiment of a scalable security architecture implementing a three-time scale out requirement using security microservices.

FIG. 2 illustrates meeting a three-time scale out requirement, according to an embodiment, using microservices. In this example, only a single microservice (DPI) requires additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy is scaled and configured independently to load balance the supply of processed data to the next hierarchy level. As shown, datacenter 216 includes datacenter rack 218, which includes physical server A, physical server B, and physical server C, 220, 222, and 224, and datacenter rack 226, which includes physical server X, physical server Y, and physical server Z, 228, 230, and 232. DPI microservices 208 have been scaled out 3X, and in this instance assigned to be performed as microservices 4-to-6 on physical server B 222 and physical server C 224. The remaining microservices of scalable security architecture are shown as being implemented by physical servers A, X, Y, and Z, 220, 228, 230, and 232. A configuration microservice 202 creates a configuration backplane and a data plane deployed as a software component on each physical server that is to receive security services. This creating process takes the form of configuring routing rules, reserving network address space (such as a subnet) and configuring virtual environments to utilize portions of the reserved address space as gateways for network communication in and out of the servers to be secured. Both the backplane and data plane may thus be considered virtual networks managed by the security system. All security microservices may then utilize these networks to transmit packets, content, state and other information among themselves. The properties of the backplane and data plane are configured to reject packet traffic from outside the security system and route information between microservices regardless of the physical server and virtual environment configuration.

Figure 3:
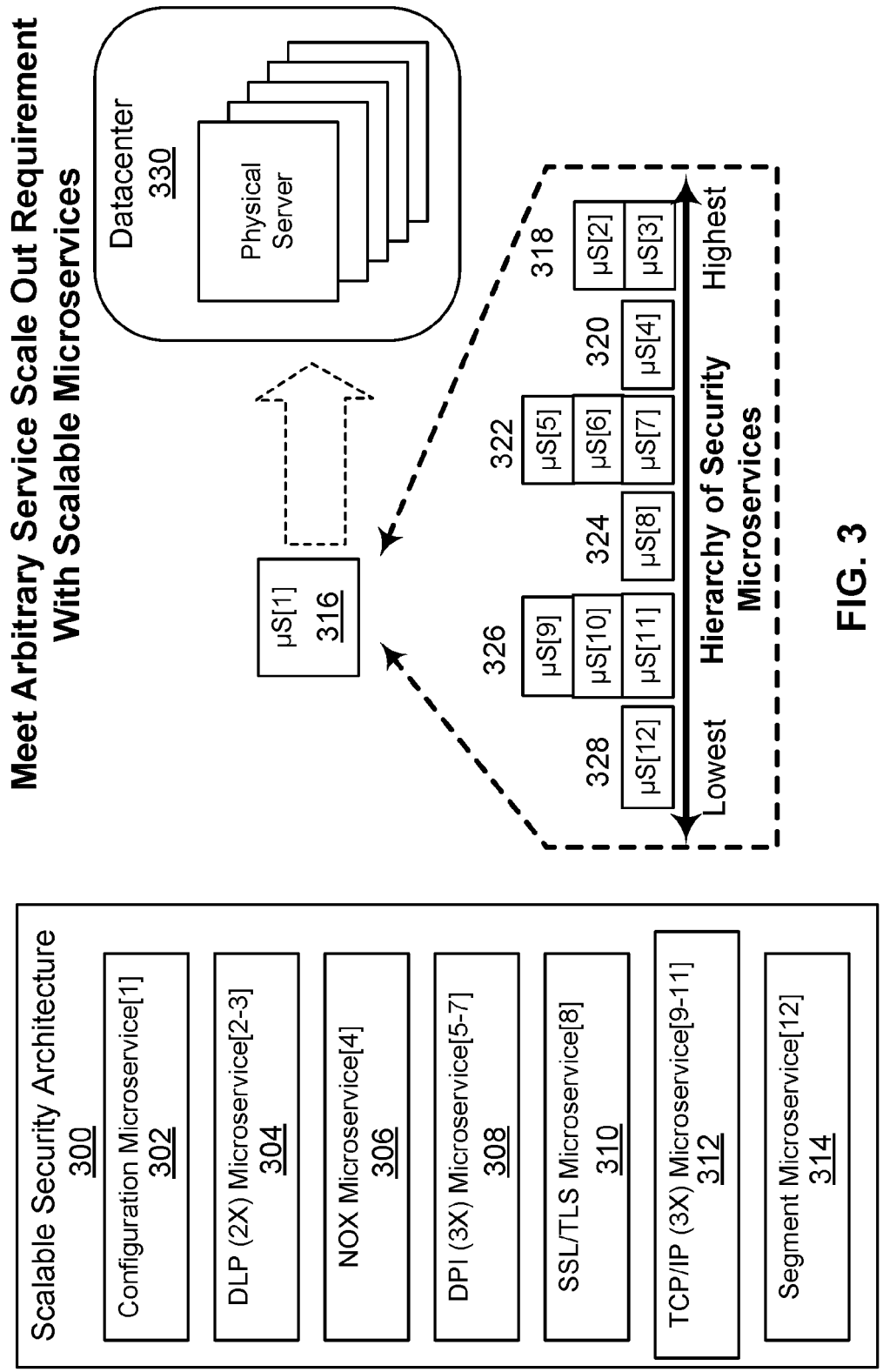
FIG. 3 illustrates meeting an arbitrary scale-out requirement by scaling out a microservice according to an embodiment.

FIG. 3 illustrates meeting an arbitrary scale-out requirement according to an embodiment. As shown, scalable security architecture 300 includes configuration microservice 302, DLP (2×) microservice 304 (needing a 2 times scale-out), NOX microservice 306, DPI (3×) microservice 308 (needing a 3 times scale-out), SSL/TLS microservice 310, TCP/IP (3×) microservice 312 (needing a 3× scale-out), and segment microservice 314. As shown, configuration microservice 316, provisions (318, 320, 322, 324, 326, and 328) the 11 microservices from a lowest hierarchy to a highest hierarchy, and configures them to communicate with each other via a backplane. The microservices are implemented by physical servers in datacenter 330.

Figure 4:
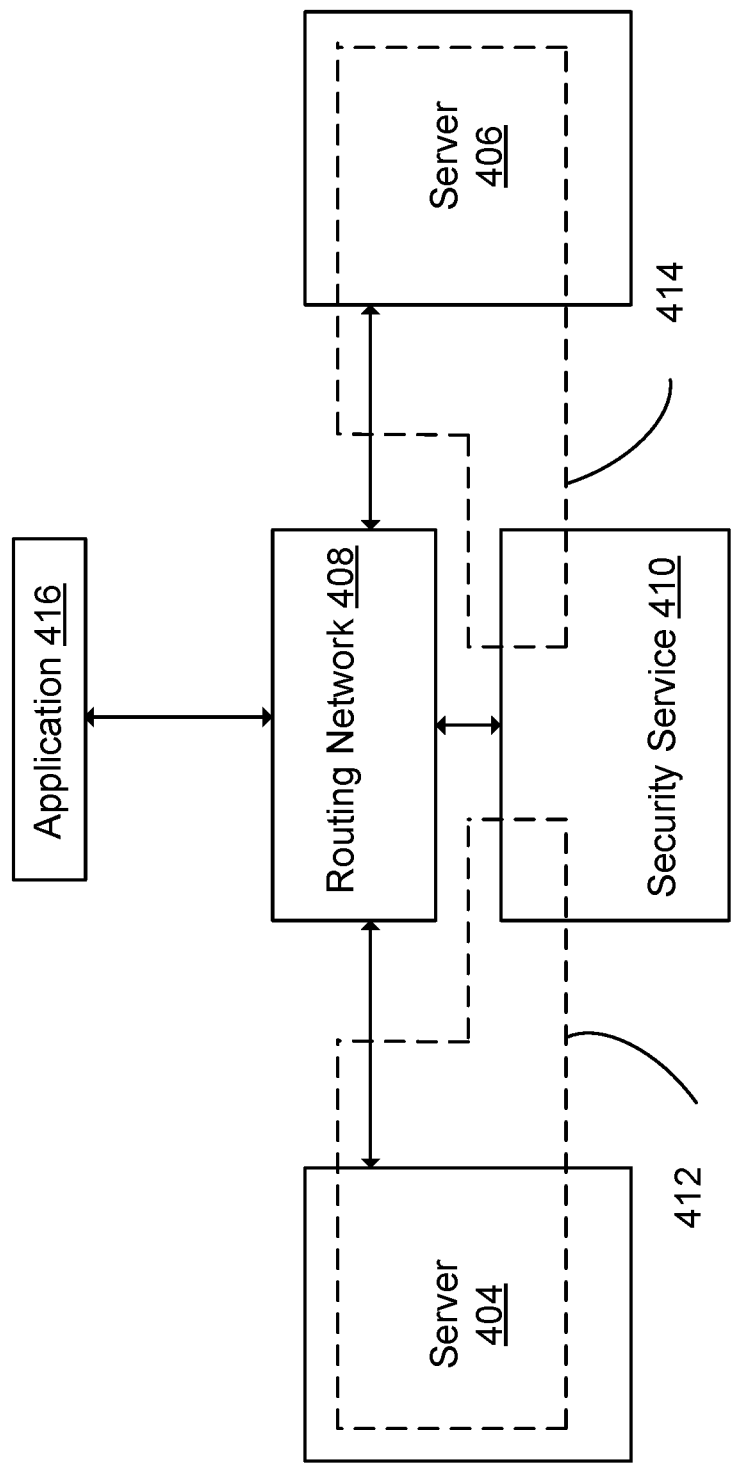
FIG. 4 is a block diagram illustrating a security service to monitor traffic between an application and one or more servers through a routing network according to an embodiment.

FIG. 4 is a system level block diagram according to an embodiment. One or more security services 410 monitor traffic between an application 416 and one or more servers 404 and 406 through a routing network 408 according to an embodiment. The security service 410 is a group of microservices used to secure traffic from/to the application 416 and the servers 404 and 406. These microservices do not need to be confined to one physical server such as server 404 or server 406. For example, one or more microservices of the security service 410 may be executed on server 404 and other microservices of the security service 410 are executed on server 406. In some embodiments, the security service 410 is executed on a server that it is not protecting.

Routing network 408 provides connectivity among server 404, server 406, security service 410, and application 416, and may support encapsulation protocols employed by embodiments disclosed herein. In some embodiments, routing network 408 is partially configured responsive to hypervisor configuration of servers 404 and 406.

By virtue of routing information included in channel data encapsulation packets, as explained further below, data traveling between an application 416 and server 404 and/or server 406 is routed to the correct server, and is kept separate from data traveling between the application 416 and the other server. Accordingly, what is essentially a private network 412 is created between the server running security service 410 and server 404. Similarly, what is essentially a private network 414 is created between the server running security service 410 and server 406.

Figure 5:
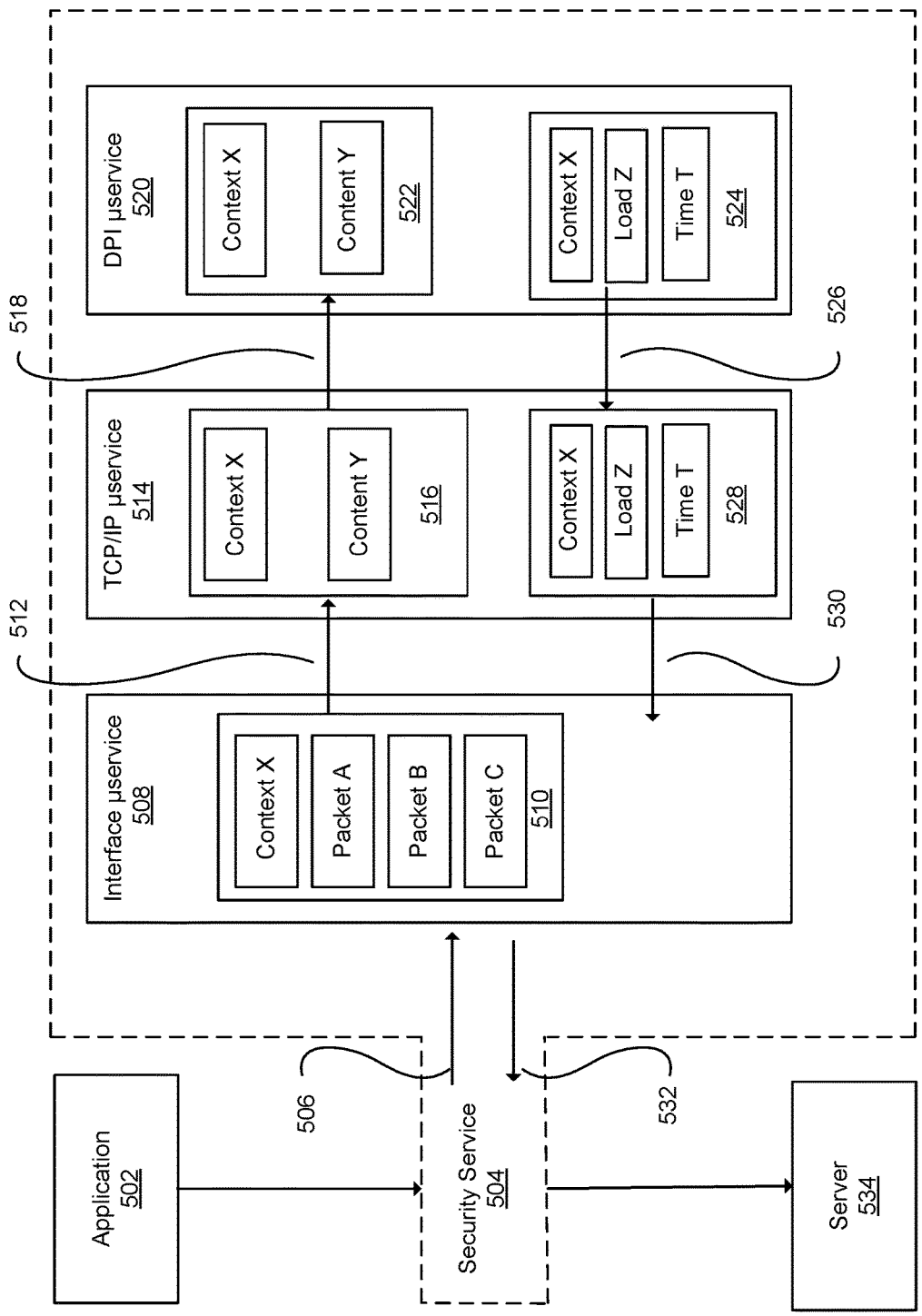
FIG. 5 is a block flow diagram illustrating application data traversing to a server after passing through a hierarchy of a security microservices according to an embodiment.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards, via path 506, the packet to interface microservice 508, which generates a channel data encapsulation packet 510, which encapsulates three packets A, B, and C, and context X. As shown, channel data encapsulation packet 510 encapsulates three packets, but in alternate embodiments, the number of encapsulated packets may vary, without limitation. In some embodiments, context X is generated based at least on the headers of packets A, B and C. In some embodiments, context X is generated through a lookup of packet header fields such as IP addresses, ports and mac addresses for the source and/or destination of the packets. In some embodiments, the generation of context X includes utilizing an interface identifier obtained from a virtualization environment. Generation of context X may be accomplished through a lookup of header fields and other data in a table, a hash of header fields and other data or another method whereby packets for which a common security policy is to be applied will have a common context or common portion, such as a bit field, of the context.

Context X may be considered an identifier describing the traffic streams, source machines or applications responsible for generating packets A, B and C. This identifier may be direct (such as an ID used as a table look up), indirect (such as a pointer used to access a data structure) or some other method of instructing microservices as to the policies and processing required for handling packets A, B and C. As an example, context X may be generated by performing a hash, longest prefix match or lookup of header fields such as IP addresses, TCP Ports, Interface Names (or MAC Addresses) or other packet properties. The generated context may then be used by security services, such as a DPI service, to determine which rules should be utilized when scanning the data from packets A, B and C (and other packets that are part of the same traffic stream). This information may be embedded within the context (as a bit field or other information), available by indirection (such as a table or data structure lookup by another service) or generated programmatically based on any combination of such information.

Interface microservice 508 transmits, via path 512, the channel data encapsulation packet 510 to TCP/IP microservice 514. As shown the channel data encapsulation packet 516 includes context X and content Y, which corresponds to packets A, B, and C of channel data encapsulation packet 510. After conducting security processing of the channel data encapsulation packet 516, TCP/IP microservice 514 transmits it to DPI microservice 520 via path 518. As shown the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 524, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, DPI microservice 520 transmits, via path 526, channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP Timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534.

The benefits of the security service 504 include the ability of each microservice to utilize the same channel data encapsulation protocol for all communication, thereby allowing scaling across the entirety of the datacenter network routable via the channel data encapsulation header. Communications between microservices maintain Context X generated at Interface microservice 508 to all subsequent microservices that no longer have access to the original packets. By providing load and timestamp data in the channel data encapsulation packets 524 and 528, which are returned via paths 526 and 530, the microservices receive and can maintain real-time loading and processing latency information utilized to make load balancing decisions.

Figure 7:
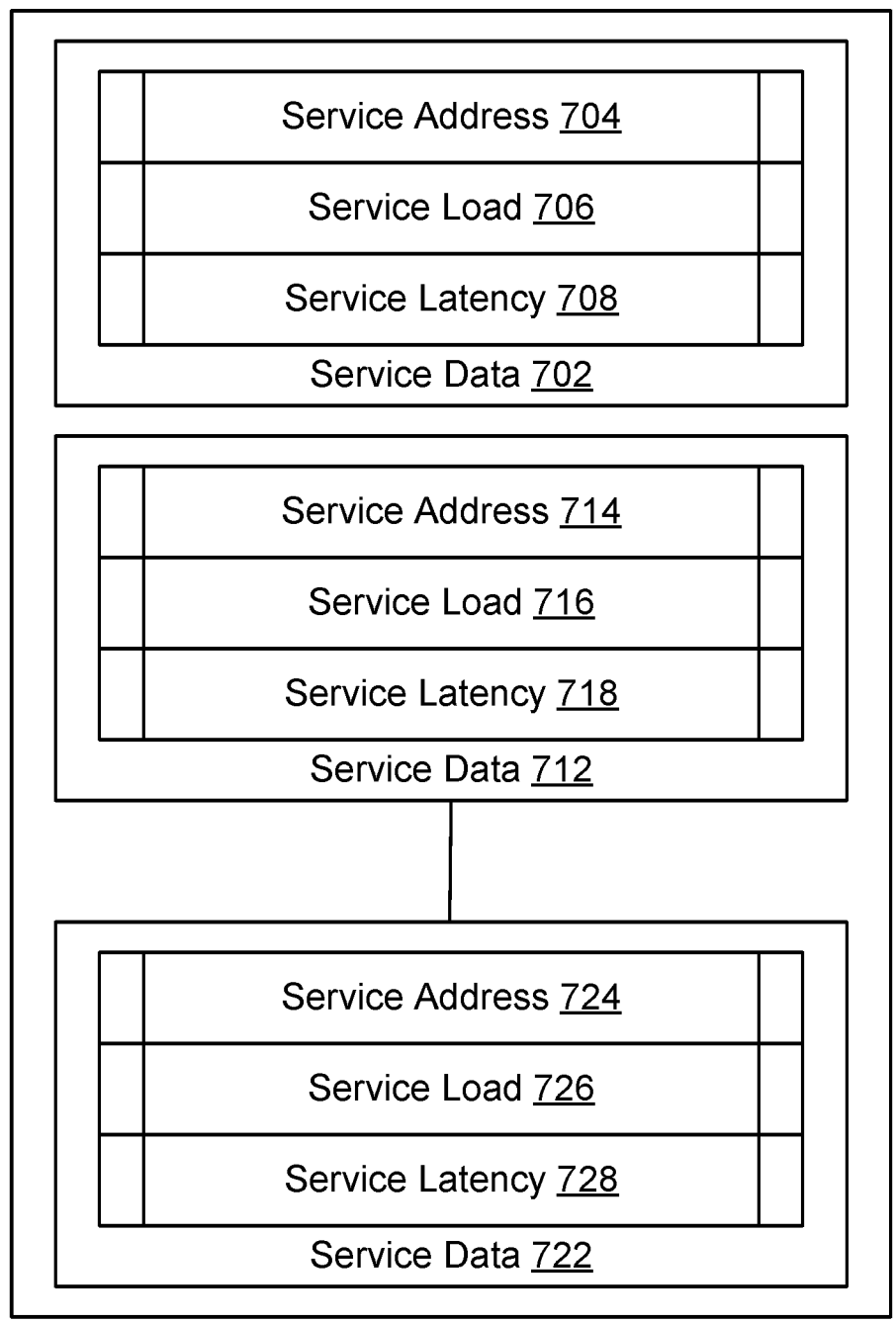
FIG. 7 illustrates a loading table according to an embodiment.

As detailed above, in some embodiments, each microservice attempts to determine a most suitable higher-level microservice through the reception of a load metric generated by each upper-level microservice in response messages. The load metrics are stored in a loading table, an embodiment of which is illustrated in FIG. 7. As illustrated, the loading table stores service data 702, 712, and 722, which contain service addresses 704, 714, and 724, service loads 706, 716, and 726; and service latencies 708, 718, and 728, respectively. In some embodiments, the loading table is parsed by the microservice to identify the least-loaded higher-level microservice to forward processed traffic to.

Service latency 708, 718, 728 consists of one or more of a timestamp, a difference of timestamps, or other derived value based on the processing performed in the microservice generating Service Data 702, 712, 722. In some embodiments, the service latency 708, 718, 728 consists of a timestamp obtained from a service request processed by an microservice, allowing the receiver of the timestamp to calculate a latency by subtracting the timestamp value from the current time. In some embodiments, the service latency 708, 718, 728 is the difference between the time of arrival of the service request and the generation of a response. In some embodiments, the service latency 708, 718, 728 is the sum of an existing latency provided in the service request and the difference between the time of arrival of the service request and the generation of the response. In some embodiments, the service latency 708, 718, 728 of one microservice is based in part on service latencies provided by other microservices.

Service address 704, 714, 724 includes a name or identifier used to distinguish one microservice from another. This address name is, for example, an IP address, a name (that may be resolved into an IP or other address), or some other identifier.

Service load 706, 716, 726 contains the last reported load obtained from a response transmission from the microservice identified by service address 704, 714, 724. Service latency 708, 718, 728 contains a time-based metric (such as latency, processing time or other metric) of the microservice identified by service address 704, 714, 724.

Figure 6:
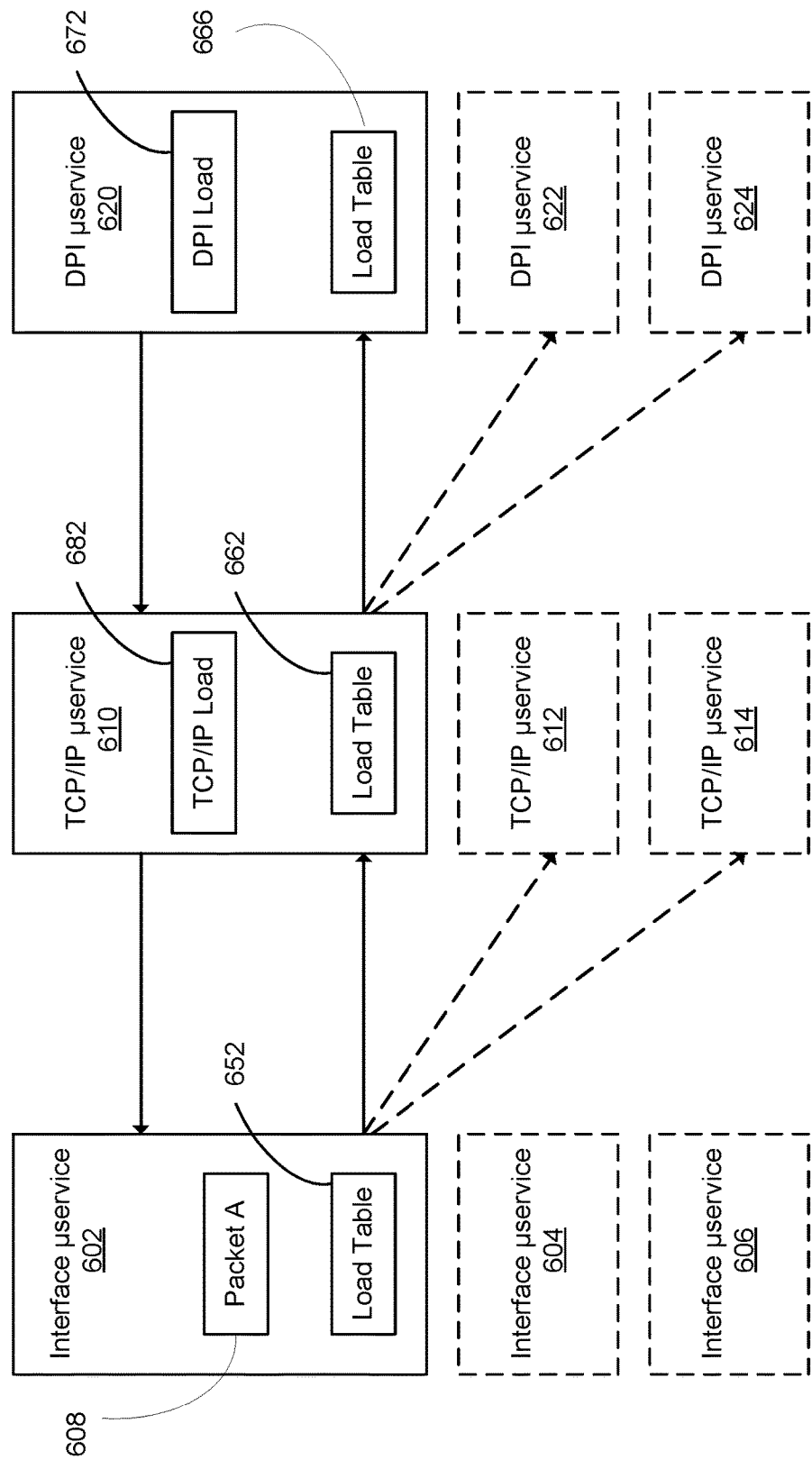
FIG. 6 is a block flow diagram illustrating the use of a load table by security microservices to select where to route data.

FIG. 6 illustrates the use of a load table by security microservices to select where to route data. Each of the security microservices 610, 612, 614, 620, 622, and 624, at the second and third levels of the hierarchy generate their own service load by measuring, scaling, and weighing properties that reflect operating parameters that are relevant to the security processing they are performing. For example, TCP/IP microservice 610 generates its own service load: TCP/IP load 682, and DPI microservice 620 generates its own service load, DPI load 672. Interface microservices 602, 604, and 606 store the service loads received as part of responses from TCP/IP microservices 610, 612, and 614, in load tables used to determine future load balancing decisions. For example, in an embodiment, interface microservice 602 stores TCP/IP load 682 received from TCP/IP microservice 610 in load table 652, which is referenced when making future load balancing decisions. Similarly, TCP/IP microservices 610, 612, and 614, store service loads received as part of responses from DPI microservices 620, 622, and 624, in load tables used to determine future load balancing decisions. For example, in an embodiment, TCP/IP microservice 610 stores DPI load 672 received from DPI microservice 620 in load table 662, which is referenced when making future load balancing decisions. Similarly, for example, DPI microservice 620 also has a load table 666, which is accessed in some load balancing decisions. TCP/IP microservice 610 and DPI microservice 620 include load tables 662 and 666, respectively.

As an example, a microservice may be configured to only consider processor utilization and memory utilization in its load calculation and consider them equally. Processor utilization (CPU utilization) may be determined (per virtual CPU core) to fall in the range of 0 to 100, while memory utilization is calculated by the application based on how much memory it is consuming. As a further example, the system administrator may determine that the particular microservice should not consume more than half the system memory of 16 GB.

To achieve this desired exemplary configuration, the microservice periodically obtains the CPU and memory measurements from the operating system, the hypervisor, or its own counters and statistics. In some embodiments, the CPU measurement is a number from 0 to 100 and the memory is a number from 0 to 16 GB. In some embodiments, the range of measurement can be programmed. CPU scaling may then be programmed to "1" reflecting the fact that it is already scaled from 0 to 100. The memory scaling may then be programmed to the quantity 100 divided by 8 GB, such that when 8 GB (half the system memory as desired) is utilized, the scaled memory measurement will be 100. To combine these measurements equally, each measurement is weighted by 0.5 such that when added, the loading produced is still in the range 0 to 100.

As illustrated, interface microservice 602 receives packet A 608, which, in some embodiments, comprises a header and data. The header may contain routing and protocol information while the data may be part of a traffic stream transported over the network. Interface microservice 602 then accesses load table 652 to conduct a load balancing to select a TCP/IP microservice to receive the packet. In some embodiments, interface microservice 602, TCP/IP microservice 610, and DPI microservice 620 communicate using an IP network such that data transmitted by a sender results in a response delivered to the same sender through communication over a socket. In some embodiments, the transmitter of information is identified through information present in each transmission.

Interface microservice 602 transmits packet A 608 to the selected TCP/IP microservice, here TCP/IP microservice 610. Packet A may be transmitted by a number of methods such as encapsulating Packet A in another protocol, transmitting a plurality of packets, including Packet A, within one larger packet with some encapsulation or header, or other means of transmitting the contents of Packet A to the TCP/IP microservice. After conducting TCP/IP processing on packet A, TCP/IP microservice accesses its load table 662 to conduct a load balancing to select a DPI microservice to receive its output. At 660, TCP/IP microservice 610 transmits its output to the selected DPI microservice, here 620. Though not shown, it should be understood that DPI microservice 620 itself accesses its load table 666 to select the next microservice to which to transmit its output.

TCP/IP microservice 610 generates its own service load and provides it to interface microservice 602, which is at a lower level of the hierarchy of security microservices. Interface microservice 602, in turn, stores the service load in its load table 652, to be accessed to inform future load balancing TCP/IP microservice selections. In some embodiments, a context, e.g., as described in FIG. 5, is used to restrict the selection of TCP/IP microservice. In some embodiments, the restriction consists of a specification of a subset of TCP/IP microservices, a priority applied to a subset of TCP/IP microservices or other means of concentrating work to be performed for packets of a specific context within a subset of the available TCP/IP microservices. In some embodiments, all TCP/IP microservices process any packets received from interface microservice 602 or any other interface microservice. In other embodiments, only TCP/IP microservices on the same physical server as interface microservice 602 are present within the loading table.

Similarly, DPI microservice 620 generates its own service load and provides it to TCP/IP microservice 610. In some embodiments, this includes the service load information of DPI microservice 620. In some embodiments, 620 updates its service load to a common memory that is accessed by TCP/IP microservice 610 and other TCP/IP microservices. In some embodiments, TCP/IP microservices 610, 612 and 614 periodically receive response messages from each of DPI microservices 620, 622 and 624 containing the respective service loads regardless of whether that have received transmissions from the TCP/IP microservices, which is at a lower level of the hierarchy of security microservices. TCP/IP microservice 610, in turn, stores the service load in load table 662, to be accessed to inform future load balancing DPI microservice selections. Each microservice provides its loading data to the plurality of lower-hierarchy microservices that send work to be performed as part of the response transmission. In one embodiment, a configuration populates initial entries into the load table to indicate that the current loading of available higher-hierarchy microservices is zero. In one embodiment, the service load is included in a response packet to the lower-hierarchy service. Not shown in this illustration, is that in some embodiments load information is transmitted to all microservices in the immediately preceding level.

In some embodiments, a load metric generated by each microservice, and sent as part of every response to a lower-level microservice, is programmatically configured to more accurately reflect the aspects of performance that are relevant to the processing performed by the particular microservice. As an example, a microservice performing logging services is primarily concerned with disk activity and capacity. Each property (such as processor utilization, memory utilization, disk capacity, disk throughput, 10 throughput, work or event throughput or other metric, etc.) is first scaled to normalize all properties to a uniform range (such as 0 to 1, 0 to 100, or other range) and then weighted to reflect the relative importance of each property for the physical and virtual environment within which the microservice is executing. To generate service load, a microservice (or microservice) uses a load generator and a configuration.

Figure 8:
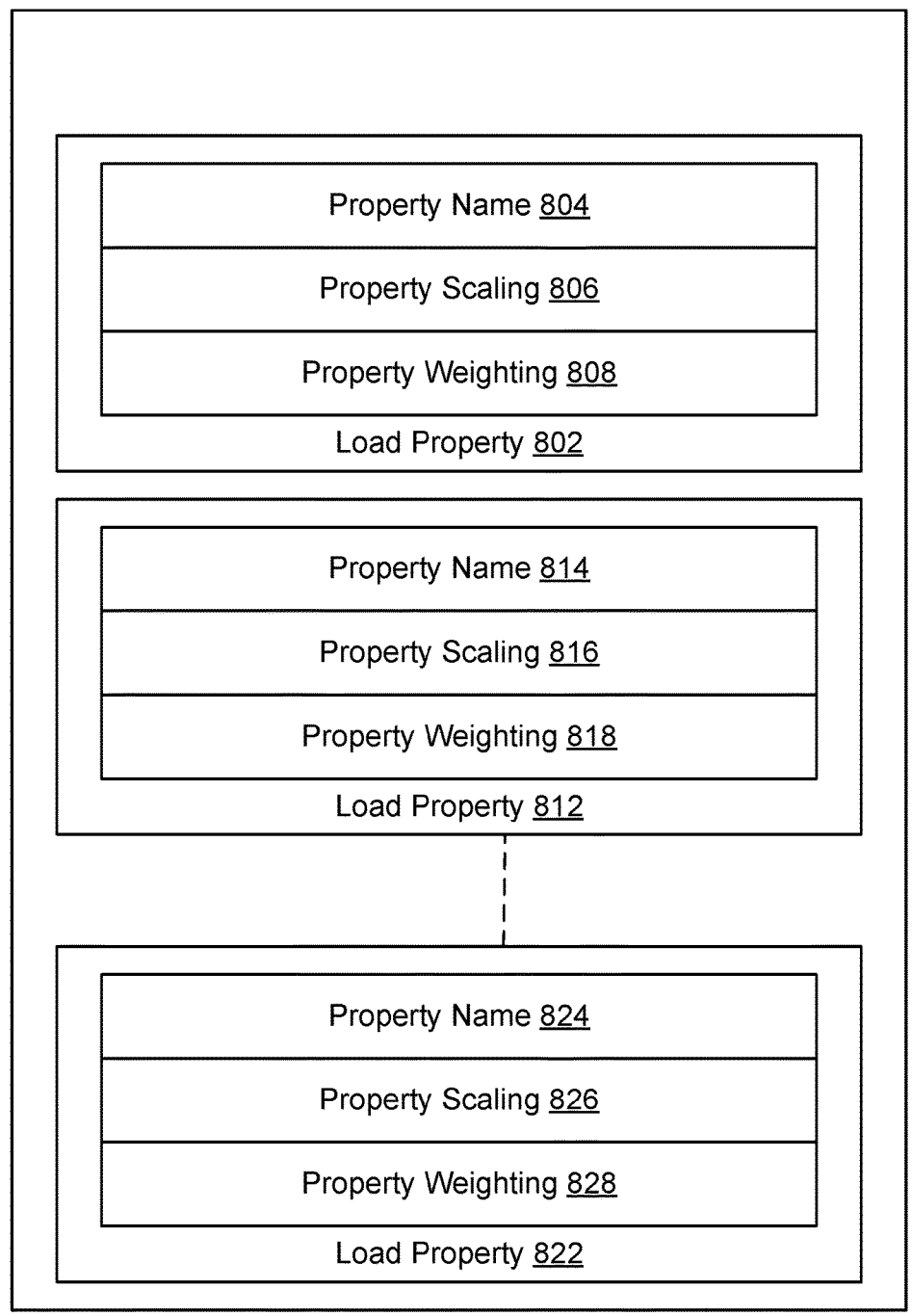
FIG. 8 illustrates a load generator configuration according to an embodiment.

FIG. 8 illustrates a service load generator configuration according to an embodiment. In this example, a service load generator configuration includes three service load property 802, 812, and 822. Load property 802 includes parameters of property name 804, property scaling 806, and property weighting 808. Load property 812 includes parameters of property name 814, property scaling 816, and property weighting 818. Load property 822 includes parameters of property name 824, property scaling 826, and property weighting 828. The load generation configuration may be reconfigured at any time.

Each load property has a name 804, 814, and 824. Further, each parameter (other than name) is one of any measureable parameters such as processor utilization, virtual CPU utilization, memory utilization, 10 packet rate, 10 packet throughput, event rate (events generated by the microservice), disk throughput, disk capacity, or other metric that is obtained or derived numerically.

Each property scaling, such as 806, is a number such that its utilization places the measurement of the respective property into a specific range. In some embodiments, the property scaling is multiplied by the property measurement. In some embodiments, the product is further processed to assure bounding to the range of a specific range.

Each property weighting, such as 808, constitutes the contribution of the respective property to the overall load measurement. In some embodiments, the property weighting is to weight the scaled first property value to reflect its relevance to the security service being performed. In some embodiments, the sum of all weightings is equal to 1 to assure that the overall load measurement has the same specified range as the individual, scaled load measurements.

Figure 9:
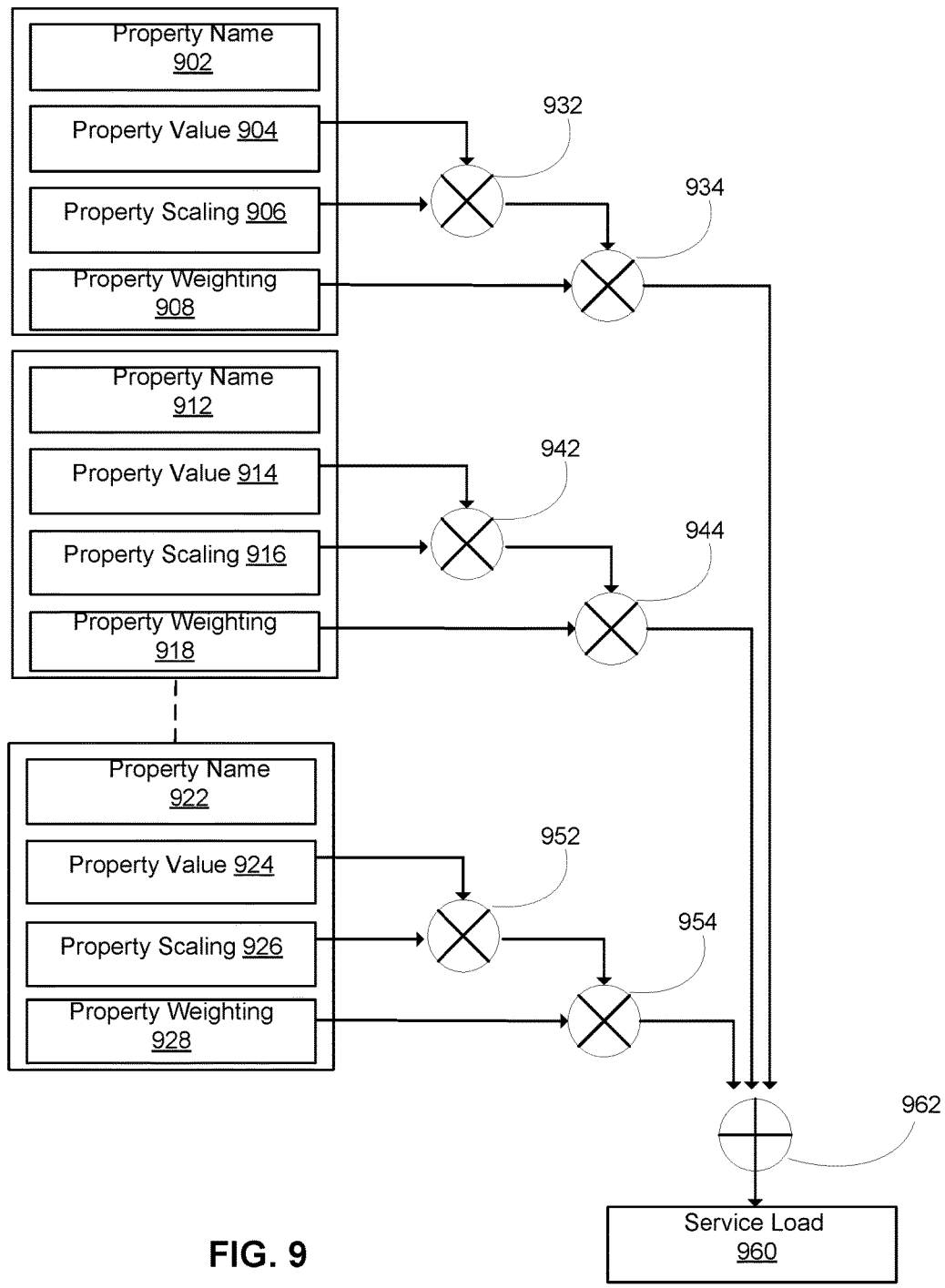
FIG. 9 illustrates generating a service load using the service load configuration according to an embodiment.

FIG. 9 illustrates generating a service load using the service load configuration according to an embodiment. As illustrated, this includes measuring a first property value 904 of a first property having property name 902 (not part of a service load property structure, but utilized by one) by a security microservice, the first property relating to a first operating parameter of the security microservice, scaling 932 the first property value to fall within a data range using a property scaling 906, weighting 934 the scaled property value by a property weighting 908 to generate a first weighted property value. This includes measuring a second property value 914 of a second property having property name 912 by the security microservice, the second property relating to a second operating parameter of the security microservice, scaling 942 the second property value 914 to fall within a data range using a property scaling 916, weighting 944 the scaled property value by a property weighting 918 to generate a second weighted property value. This further includes measuring a third property value 924 of a third property having property name 922 by the security microservice, the third property relating to a third operating parameter of the security microservice, scaling 952 the third property value 924 to fall within a data range using a property scaling 926, weighting 954 the scaled property value by a property weighting 928 to generate a third weighted property value. Finally, the security microservice uses, the first, second, and third weighted property values at 962 to generate a service load 960.

In particular, at 932, a property value is multiplied by its property scaling. At 934, that product is multiplied by a property weighting, generating the contribution to the total load measurement by property name. At 942 and 944 this is repeated for a second property using a second property value 914, a second property scaling 916, and a second property weighting 918. At 952 and 954, this is repeated for the last property. At 962, all scaled and weighted contributions of the properties are summed to generate a service load 960.

Figure 10:
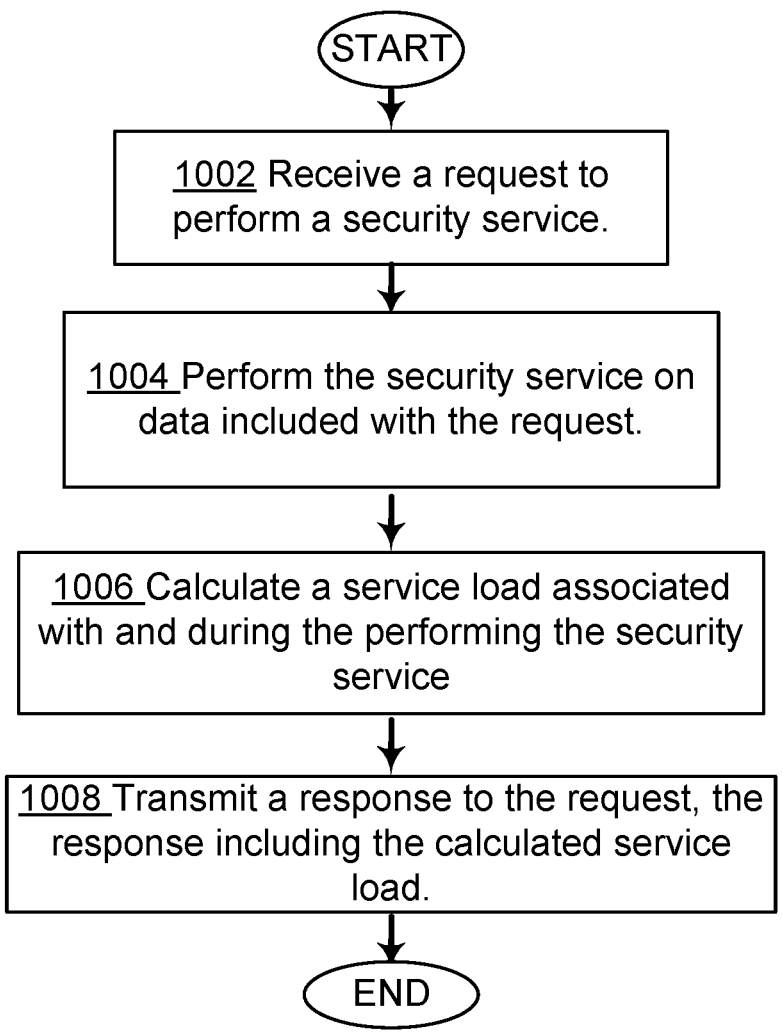
FIG. 10 is a flow diagram illustrating the use of a load table by security microservices to select where to route data.

FIG. 10 illustrates an embodiment of a method. Typically, this method is performed by a microservice.

At 1002, a request to perform a security service is received. For example, a request to perform TCP/IP, DPI, etc. is received by an appropriate microservice.

At 1004, the security microservice performs the security service on data included with the request. If a result of the performance is to be forwarded, the security microservice uses its load table to determine who to send the result to.

At 1006, the security microservice calculates a service load associated with and during the performing of the security service.

At 1008, the security microservice transmits a response to the request to the requestor, wherein the response includes the calculated service load of the security microservice. As detailed above, this service load is stored in a load table of the requestor.

In one embodiment, the calculated service load value is transmitted as a field of the response data. In another embodiment, the transmitted load value is used as a handle to obtain calculated load values from a global memory or service available to the lower-level hierarchy microservice. In some embodiments, the lower hierarchy microservice requests a current service load from a higher-level hierarchy microservice by transmitting a null request, i.e. a transmission without a request for a security service and receive as part of the response the calculated service load.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments accomplish the data handling and distribution by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions cause a general-purpose or special-purpose hardware processor that is programmed with the instructions to perform the steps of the at least one embodiment. Embodiments of the present invention may be provided as a computer program product or software which may include a machine or computer-readable medium having stored thereon instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Computer-executable Instructions used to program circuits to perform at least one embodiment are stored within a memory in the system, such as DRAM, cache, flash memory, or other storage. Furthermore, the instructions can be distributed via a network or by way of other computer readable media. Thus a machine-readable medium may include any mechanism for storing or No numbers found in figures. information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

The above may provide many benefits. As an example, consider an embodiment of an event generator microservice responsible for inserting events into a database upon detection of an anomaly. If executing upon a virtual host with limited disk throughput, the microservice according to an embodiment is configured to weigh event count and disk capacity highly while weighing other aspects of performance, such as CPU, memory or I/O usage, at lower levels. The loading provided by this microservice to lower-level microservices aims to accurately reflect the capabilities of this microservice. Additionally, if the microservice is relocated to a physical service with ample disk capacity but limited memory, the weightings may be reconfigured to increase the memory utilization component while decreasing the disk capacity component of the overall load metric.

What is claimed is:

1. A method of performing a security service comprising:
receiving network data at each of a hierarchy of microservices including, at a lowest level, an interface microservice to receive network data, each of the microservices to run on a processor core and to attempt to determine the most efficiently usable higher-level microservice to which to transfer processed data, the determination being made without requiring knowledge of impending processing requirements of the higher-level microservice, and instead by accessing a load table containing temporally relevant and scaled loading metrics generated by and received from higher-level microservices in prior responses; and processing received network data by each microservice by performing a security service on data included with a request, calculating a service load associated with and during the performing the security service, and transmitting a response including the service load.

2. The method of claim 1, wherein the service load comprises a first property value dynamically configurable to calculate one of processor utilization, memory utilization, disk capacity, disk throughput, input/output throughput, and event throughput.

3. The method of claim 1, wherein the hierarchy of microservices, in addition to the interface microservice, comprises:
a transmission control protocol/internet protocol (TCP/IP) microservice;
a secure socket layer (SSL) microservice;
a deep packet inspection (DPI) microservice;
a network object extractor (NOX) microservice; and
a data loss prevention (DLP) microservice,
wherein the method further comprises a configuration microservice provisioning the plurality of microservices, populating initial entries into their load tables, configuring their routing rules, and configuring them to communicate over a virtual backplane.

4. The method of claim 1, wherein memory used by each microservice is isolated from memory used by other microservices, the method further comprising moving a first microservice to a different processor core, and terminating a second microservice abnormally, without interrupting the rest of the microservices.

5. The method of claim 1, wherein the service load comprises first and second property values dynamically configurable to calculate two of processor utilization, memory utilization, disk capacity, disk throughput, input/output throughput, and event throughput, wherein the service load further comprises first and second property scaling values to scale the first and second property values to a uniform range.

6. The method of claim 5, the service load further comprising a third property value dynamically configurable to calculate another one of processor utilization, memory utilization, disk capacity, disk throughput, input/output throughput, and event throughput, wherein the service load further comprises a third property scaling value to scale the third property value to the uniform range, and first, second, and third property weightings to weight relevance of each of the first, second, and third property values to the security service being performed.

7. The method of claim 1, wherein the service load comprises a property value, a property scaling, and a property weighting.

8. A system to perform a security service comprising:
a hierarchy of microservices including, at a lowest level, an interface microservice to receive network data, each of the microservices to run on a processor core and to attempt to determine the most efficiently usable higher-level microservice to which to transfer processed data, the determination to be made without requiring knowledge of impending processing requirements of the higher-level microservice, and instead by accessing a load table containing temporally relevant and scaled loading metrics generated by and received from higher-level microservices in prior responses; and
each microservice to process received network data by performing a security service on data included with a request, calculating a service load associated with and during the performing the security service, and transmitting a response to the request, the response to include the service load.

9. The system of claim 8, wherein the hierarchy of microservices, in addition to the interface microservice, comprises:
a transmission control protocol/internet protocol (TCP/IP) microservice;
a secure socket layer (SSL) microservice;
a deep packet inspection (DPI) microservice;
a network object extractor (NOX) microservice; and
a data loss prevention (DLP) microservice,
wherein the system further comprises a configuration microservice to provision the plurality of microservices, populate initial entries into their load tables, configure their routing rules, and configure them to communicate over a virtual backplane.

10. The system of claim 8, wherein each of the hierarchy of microservices is implemented with machine-executable instructions running on a virtual machine, the virtual machine incorporated into a virtual chassis hosted in a datacenter environment on a hardware platform, and wherein the plurality of microservices are coupled to exchange data via a virtual backplane, the system further comprising a dynamic configuration microservice to provision each of the plurality of microservices, set their routing rules, and initialize their load tables.

11. The system of claim 8, further comprising each microservice calculating and transmitting its service load to every microservice at an immediately lower level of the hierarchy.

12. The system of claim 8, wherein the service load comprises first and second property values dynamically configurable to calculate two of processor utilization, memory utilization, disk capacity, disk throughput, input/output throughput, and event throughput, the second property value to be scaled according to a second property scaling and weighted according to a second property weighting, wherein the service load further comprises first and second property scaling values to scale the first and second property values to a uniform range.

13. The system of claim 12, the service load further comprising a third property value dynamically configurable to calculate another one of processor utilization, memory utilization, disk capacity, disk throughput, input/output throughput, and event throughput, wherein the service load further comprises a third property scaling value to scale the third property value to the uniform range, and further to comprise first, second, and third property weightings to weight relevance of each of the first, second, and third property values to the security service being performed.

14. The system of claim 8, wherein the service load comprises a property value, a property scaling, and a property weighting.

15. A non-transitory computer-readable medium containing computer-executable instructions to which a system to perform a security service is to respond by:
receiving network data at each of a hierarchy of microservices including, at a lowest level, an interface microservice to receive network data, each of the microservices to run on a processor core and to attempt to determine the most efficiently usable higher-level microservice to which to transfer processed data, the determination being made without requiring knowledge of impending processing requirements of the higher-level microservice, and instead by accessing a load table containing temporally relevant and scaled loading metrics generated by and received from higher-level microservices in prior responses; and processing received network data by each microservice by performing a security service on data included with a request, calculating a service load associated with and during the performing the security service, and transmitting a response including the service load.

16. The non-transitory computer-readable medium of claim 15, wherein the service load comprises a first property value dynamically configurable to calculate one of processor utilization, memory utilization, disk capacity, disk throughput, input/output throughput, and event throughput.

17. The non-transitory computer-readable medium of claim 16, wherein the service load further comprises a first property scaling to scale the first property value to a uniform range.

18. The non-transitory computer-readable medium of claim 17, wherein the service load further comprises a first property weighting to weight the scaled first property value to reflect its relevance to the security service being performed.

19. The non-transitory computer-readable medium of claim 18, the service load further comprising a second property value selected from a group consisting of processor utilization, memory utilization, disk capacity, disk throughput, input/output throughput, and event throughput, the second property value to be scaled according to a second property scaling and weighted according to a second property weighting.

20. The non-transitory computer-readable medium of claim 19, the service load further comprising a third property value selected from a group consisting of processor utilization, memory utilization, disk capacity, disk throughput, input/output throughput, and event throughput, the third property value to be weighted according to a third property weighting.

* * * * *